United States Patent
Yuan et al.

(10) Patent No.: US 8,217,614 B2
(45) Date of Patent: Jul. 10, 2012

(54) FAN DELAY CONTROLLING APPARATUS

(75) Inventors: Guang-Dong Yuan, Shenzhen (CN); Xun-Chun Qiu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 396 days.

(21) Appl. No.: 12/629,891

(22) Filed: Dec. 3, 2009

(65) Prior Publication Data

US 2011/0075354 A1    Mar. 31, 2011

(30) Foreign Application Priority Data

Sep. 25, 2009  (CN) .......................... 2009 1 0307739

(51) Int. Cl.
  *H05K 7/20* (2006.01)
  *H02P 3/00* (2006.01)
(52) U.S. Cl. ........ 318/472; 318/471; 318/378; 388/804; 388/811; 417/32
(58) Field of Classification Search .................. 318/471, 318/278, 268, 804, 400.01, 472; 388/804, 388/811; 417/32; 415/1
See application file for complete search history.

(56) References Cited

U.S. PATENT DOCUMENTS

| | | | | |
|---|---|---|---|---|
| 4,085,594 A * | 4/1978 | Mayer | | 62/171 |
| 5,448,143 A * | 9/1995 | Pecone | | 318/434 |
| 6,392,372 B1 * | 5/2002 | Mays, II | | 318/400.01 |
| 6,545,438 B1 * | 4/2003 | Mays, II | | 318/400.01 |
| 7,235,943 B2 * | 6/2007 | Hsiang et al. | | 318/471 |
| 7,355,359 B2 * | 4/2008 | Kuo | | 318/268 |
| 7,501,717 B2 * | 3/2009 | Chen | | 307/38 |
| 7,541,762 B2 * | 6/2009 | Chen et al. | | 318/434 |
| 7,583,043 B2 * | 9/2009 | Chung et al. | | 318/634 |
| 7,987,024 B2 * | 7/2011 | Tunks et al. | | 700/299 |
| 2003/0011332 A1 * | 1/2003 | Mays, II | | 318/254 |
| 2006/0013571 A1 * | 1/2006 | Squibb | | 388/804 |
| 2007/0019383 A1 * | 1/2007 | Chang | | 361/695 |
| 2007/0081800 A1 * | 4/2007 | Hsiang et al. | | 388/811 |
| 2007/0108923 A1 * | 5/2007 | Chen | | 318/66 |
| 2007/0229291 A1 * | 10/2007 | Kuo | | 340/584 |
| 2007/0292257 A1 * | 12/2007 | Ooi et al. | | 415/1 |
| 2008/0095521 A1 * | 4/2008 | Chen et al. | | 388/829 |
| 2008/0170947 A1 * | 7/2008 | Sutardja | | 417/32 |
| 2009/0003806 A1 * | 1/2009 | Zou et al. | | 388/811 |
| 2009/0162039 A1 * | 6/2009 | Zou et al. | | 388/811 |
| 2009/0167228 A1 * | 7/2009 | Chung et al. | | 318/455 |
| 2009/0169188 A1 * | 7/2009 | Huang et al. | | 388/811 |
| 2009/0208192 A1 * | 8/2009 | Xi et al. | | 388/819 |
| 2010/0087965 A1 * | 4/2010 | Tunks et al. | | 700/300 |

* cited by examiner

Primary Examiner — Paul Ip
(74) Attorney, Agent, or Firm — Altis Law Group, Inc.

(57) ABSTRACT

A fan delay controlling apparatus includes a connector connected to a fan of an electronic device, a power supplying module connected to the connector, and a power controlling module connected to the power supplying module. The power supplying module is connected to a fan power source and a stand-by power source. The power controlling module controls the power supplying module supply power to the fan when the electronic device including the fan powers off until an ambient temperature is lower than a predetermined value.

9 Claims, 4 Drawing Sheets

FAN DELAY CONTROLLING APPARATUS

BACKGROUND

1. Technical Field

The present disclosure relates to a fan delay controlling apparatus.

2. Description of Related Art

A conventional cooling fan for an electronic device, a computer for instance, stops rotating when the electronic device powers off. The remaining heat is dissipated slowly with the cooling fan having been shut down. The temperature in the electronic device can not be decreased quickly when the surrounding temperature is high.

DETAILED DESCRIPTION

Figure 1:
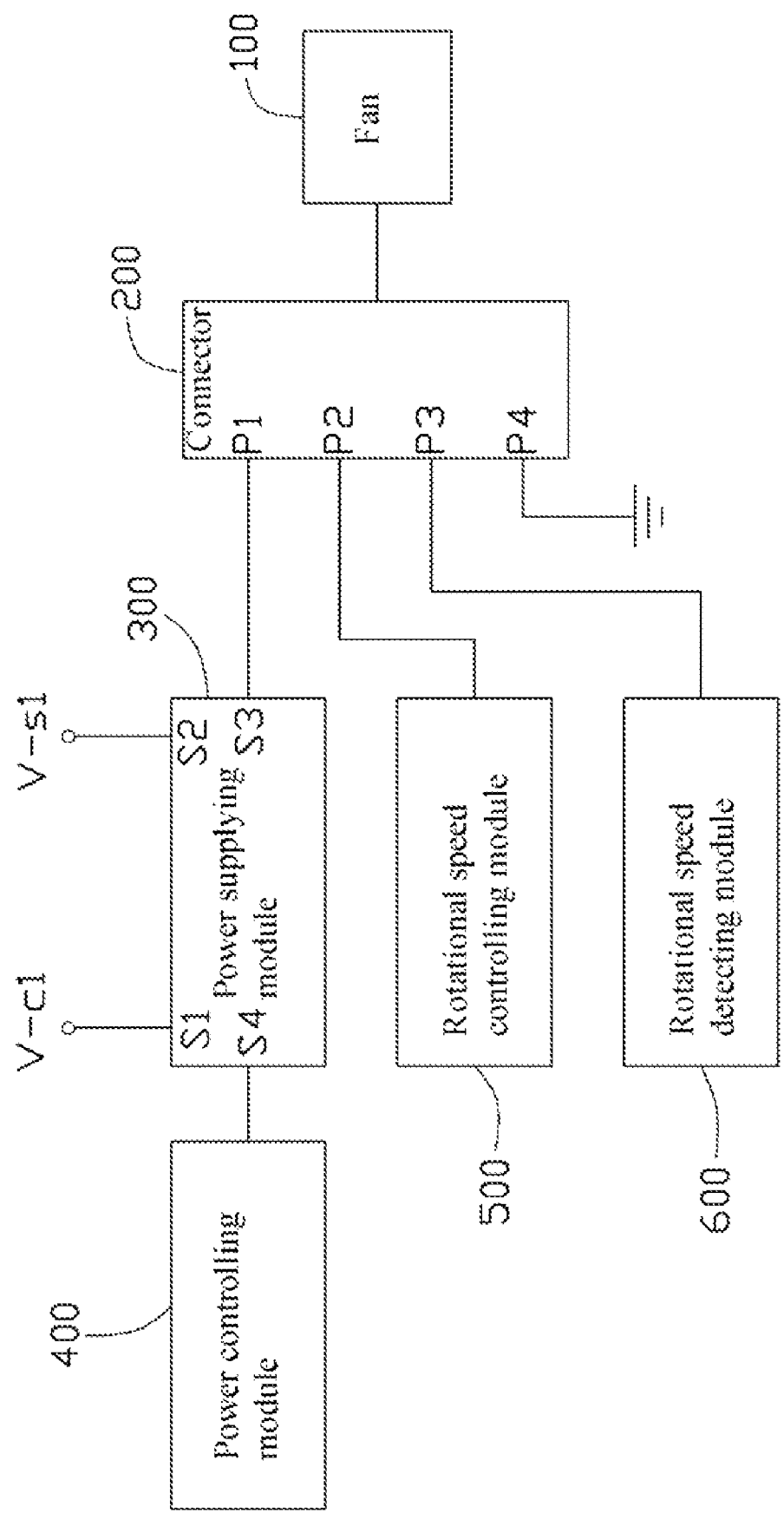
FIG. 1 is a block diagram of an exemplary embodiment of a fan delay controlling apparatus, the fan delay controlling apparatus including a power supplying module, a power controlling module, a rotational speed controlling module, a rotational speed detecting module, and a connector.

Referring to FIG. 1, an exemplary embodiment of a fan delay controlling apparatus is allocated to control a fan 100 of a computer. The fan delay controlling apparatus includes a connector 200, a power supplying module 300, a power controlling module 400, a rotational speed controlling module 500, and a rotational speed detecting module 600.

The connector 200 is connected to the fan 100. The connector 200 includes a power terminal P1, a controlling terminal P2, a detecting terminal P3, and a ground terminal P4.

The power supplying module 300 includes a first terminal 51, a second terminal S2, a third terminal S3, and a fourth terminal S4. The first terminal 51 of the power supplying module 300 is connected to a fan power source V-c1. The second terminal S2 of the power supplying module 300 is connected to a first stand-by power source V-s1 of a motherboard of the computer. The third terminal S3 of the power supplying module 300 is connected to the power terminal P1 of the connector 200. The fourth terminal S4 of the power supplying module 300 is connected to the power controlling module 400.

In one embodiment, the voltage of the fan power source V-c1 is +12 volts (V). The voltage of the first stand-by power source V-s1 is +5V.

The power controlling module 400 detects the temperature in an enclosure housing the fan 100 of the computer, and converts the temperature to a voltage signal. The power controlling module 400 compares a value of the voltage signal and a value of a predetermined voltage, and controls the power supplying module 300 to supply power to the connector 200 when the temperature in the housing is above a predetermined temperature corresponding to the predetermined voltage. The power controlling module 400 controls the power supplying module 300 to discontinue supplying power to the connector 200 when the temperature in the housing is below the predetermined temperature corresponding to the predetermined voltage.

The rotational speed controlling module 500 is connected to the controlling terminal P2 of the connector 200, to control the rotational speed of the fan 100.

The rotational speed detecting module 600 is connected to the detecting terminal P3 of the connector 200, to detect the rotating rate of the fan 100.

Figure 2:
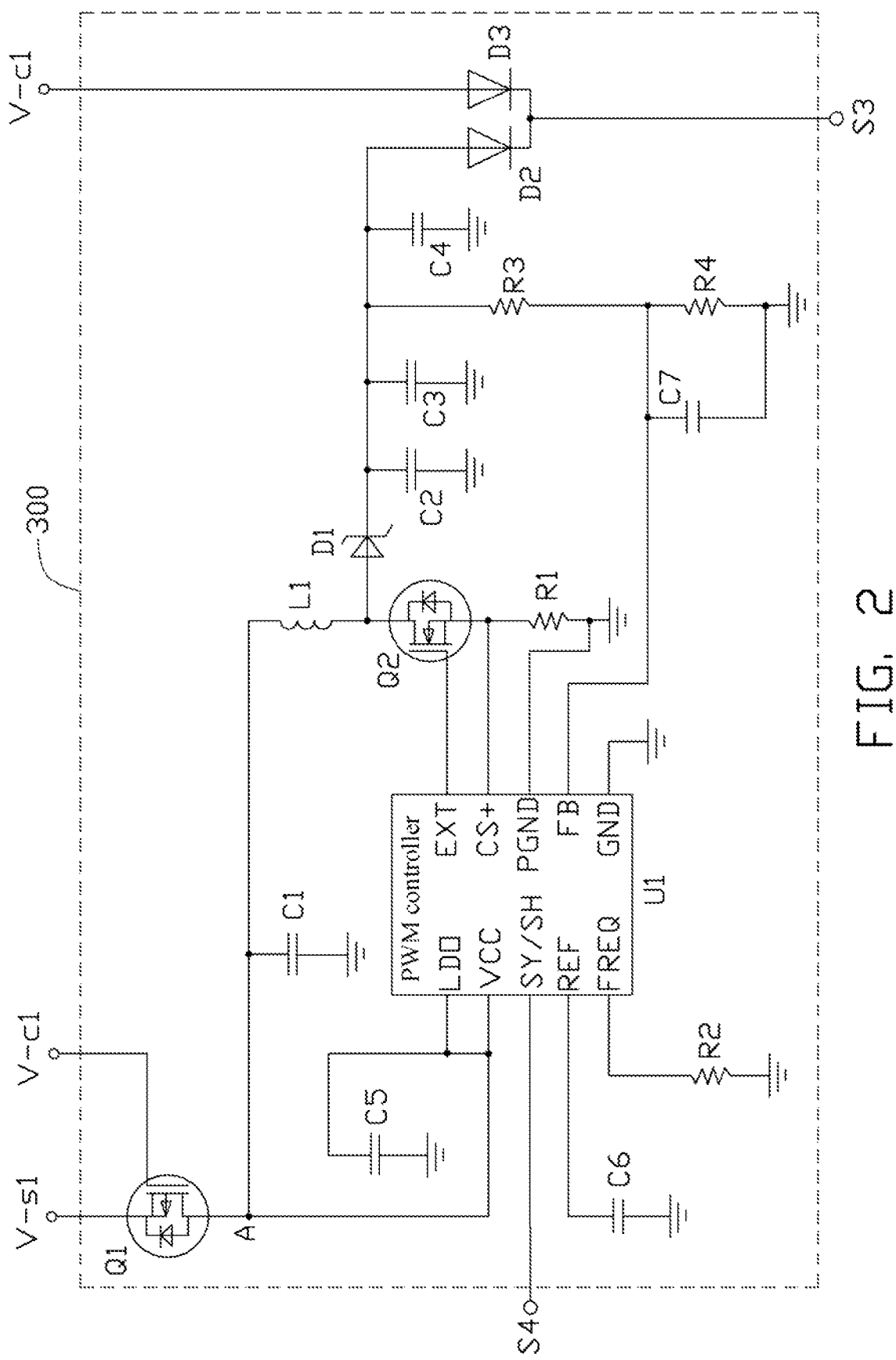
FIG. 2 is a circuit diagram of an exemplary embodiment of the power supplying module of the fan delay controlling apparatus of FIG. 1.

Referring to FIG. 2, the power supplying module 300 includes a p-channel metal oxide semiconductor field effect transistor (PMOSFET) Q1, an n-channel MOSFET (NMOSFET) Q2, a pulse width modulation (PWM) controller U1, an inductor L1, a first diode D1, a second diode D2, a third diode D3, four resistors R1~R4, and seven capacitors C1~C7. Electrical current through the resistor R1 may be detected by a current sensor of the PWM controller U1.

An anode of the third diode D3 functions as the first terminal S1 of the power supplying module 300, to be connected to the fan power source V-c1. A cathode of the third diode D3 functions as the third terminal S3 of the power supplying module 300, to be connected to the power terminal P1 of the connector 200. The cathode of the third diode D3 is also connected to a cathode of the second diode D2. A source of the PMOSFET Q1 functions as the second terminal S2 of the power supplying module 300, to be connected to the first stand-by power source V-s1.

A gate of the PMOSFET Q1 is connected to the fan power source V-c1. A drain of the PMOSFET Q1 is connected to a first terminal of the inductor L1 and grounded via the capacitor C1. A node between the capacitor C1 and the drain of the PMOSFET Q1 is labeled "A".

A drain of the NMOSFET Q2 is connected to a second terminal of the inductor L1 and an anode of the first diode D1. A source of the NMOSFET Q2 is grounded via the resistor R1. A cathode of the first diode D1 is connected to an anode of the second diode D2. The cathode of the first diode D1 is also grounded via the capacitors C2-C4 in parallel. The capacitors C2-C4 are allocated to stabilize the voltage of the cathode of the first diode D1.

The PWM controller U1 is a MAX668 PWM controller. The PWM controller U1 includes a power terminal VCC, a ground terminal GND, a frequency input FREQ, a synchronization/shut down input SY/SH, a positive current sense input CS+, a power ground for external gate-driver/negative current sense input PGND, a feed back input FB, a 5V on-chip regulator output LDO, a 1.25V reference output REF, and an external gate-driver output EXT.

The power terminal VCC of the PWM controller U1 is connected to the 5V on-chip regulator output LDO and the drain of the PMOSFET Q1. The 5V on-chip regulator output LDO is grounded via the capacitor C5. The ground terminal GND is grounded.

The synchronization/shut down input SY/SH functions as the fourth terminal S4 of the power supplying module 300, to be connected to the power controlling module 400. The external gate-driver output EXT outputs a square wave when the synchronization/shut down input SY/SH is at a high level. The PWM controller U1 stops working when the synchronization/shut down input SY/SH is at a low level.

The 1.25V reference output REF is grounded via the capacitor C6. The frequency input FREQ is grounded via the resistor R2. The external gate-driver output EXT is connected to a gate of the NMOSFET Q2. The positive current sense input CS+ is connected to the source of the NMOSFET Q2. The positive current sense input CS+ is also connected to the power ground for external gate-driver/negative current sense input PGND via the resistor R1. The power ground for external gate-driver/negative current sense input PGND is grounded. The feed back input FB is connected to the cathode of the first diode D1 via the resistor R3. The feed back input FB is also grounded via the resistor R4 and the capacitor C7 in parallel.

Figure 3:
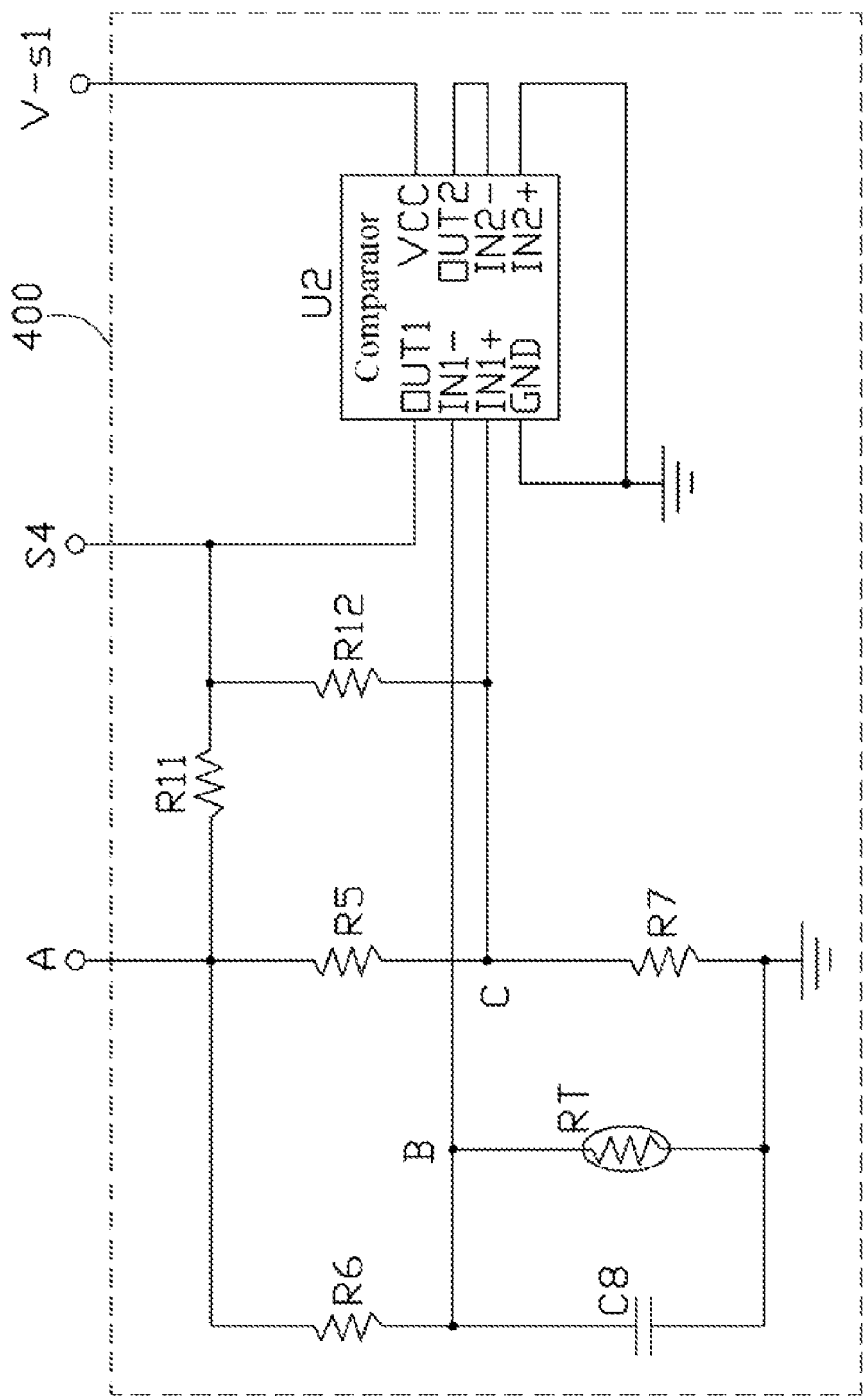
FIG. 3 is a circuit diagram of an exemplary embodiment of the power controlling module of the fan delay controlling apparatus of FIG. 1.

Referring to FIG. 3, the power controlling module 400 includes a comparator U2, a thermistor RT, a capacitor C8, five resistors R11, R12, and R5-R7. A first terminal of the resistor R5 is connected to the node A between the capacitor C1 and the drain of the PMOSFET Q1. A second terminal of the resistor R5 is grounded via the resistor R7. A first terminal of the resistor R6 is connected to the drain of the PMOSFET Q1. A second terminal of the resistor R6 is grounded via the thermistor RT and the capacitor C8 in parallel. The thermistor RT is a negative temperature coefficient thermistor. A node between the resistor R6 and the thermistor RT is labeled "B". A node between the resistor R5 and R7 is labeled "C". The capacitor C8 is allocated to prevent fluctuation of the voltage of the node B.

The comparator U2 is a LM393 comparator. The comparator U2 includes a first non-inverting input IN1+, a first inverting input IN1−, a first output OUT1, a second non-inverting input IN2+, a second inverting input IN2−, a second output OUT2, a power terminal VCC, and a ground terminal GND. The first non-inverting input IN1+ is connected to the node C between the resistors R5 and R7. The first inverting input IN1− is connected to the node B between the resistor R6 and the thermistor RT. The first output OUT1 is connected to the fourth terminal S4 of the power supplying module 300. The first output OUT1 is also connected to the drain of the PMOSFET Q1 via the resistor R11. The power terminal VCC of the comparator U2 is connected to the first stand-by power source V-s1. The ground terminal GND of the comparator U2 is grounded. The second non-inverting input IN2+ is grounded. The second inverting input IN2− is connected to the second output OUT2. The resistor R12 is connected between the first non-inverting input IN1+ and the first output OUT1.

Figure 4:
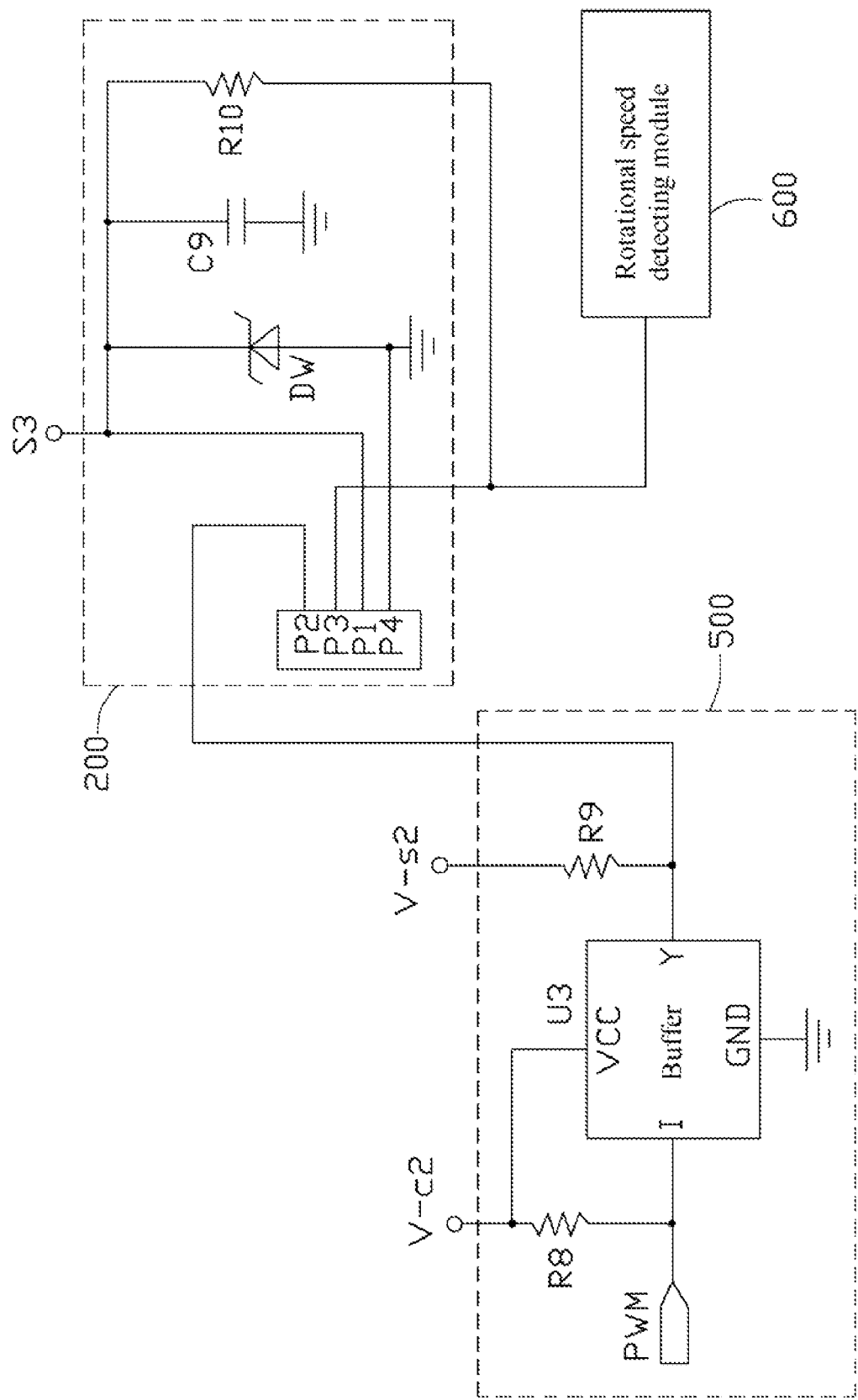
FIG. 4 is a circuit diagram of an exemplary embodiment of the rotational speed controlling module and the connector of the fan delay controlling apparatus of FIG. 1.

Referring to FIG. 4, the rotational speed controlling module 500 includes a buffer U3, and two resistors R8 and R9. The buffer U3 includes a power terminal VCC, a ground terminal GND, an input I to receive a PWM signal, and an output Y. The power terminal VCC is connected to a system power source V-c2. The ground terminal GND is grounded. The input I is connected to the system power source V-c2 via the resistor R8. The output Y of the buffer U3 is connected to the controlling terminal P2 of the connector 200. The output Y of the buffer U3 is also connected to a second stand-by power source V-s2.

The buffer U3 is a 74LVC07A buffer. The truth table of the buffer U3 is shown as below:

| Input I | Output Y |
|---------|----------|
| L       | L        |
| H       | Z        |

Where, the letter "L" refers to a low voltage state. The letter "H" refers to a high voltage state. The letter "Z" refers to a high impedance off-state.

The system power source V-c2, the PWM signal, the buffer U3, and the second stand-by power source V-s2 control the rotating rate of the fan 100 when the computer powers on. The voltage of the system power source V-c2 is 0V and the second stand-by power source V-s2 controls the rotating rate of the fan 100 when the computer powers off.

The power terminal P1 of the connector 200 is connected to a cathode of a voltage stabilizing diode DW. The anode of the voltage stabilizing diode DW is grounded. The power terminal P1 of the connector 200 is also connected to the detecting terminal P3 via a resister R10. The power terminal P1 is also grounded via a capacitor C9. The voltage stabilizing diode DW is allocated to stabilize the voltage of the power terminal P1. The resister R10 and the capacitor C9 are allocated to protect the power terminal P1 when the voltage of the power terminal P1 is over-voltage.

When the computer powers on, the voltage of the source of the PMOSFET Q1 is +5V and the voltage of the gate of the PMOSFET Q1 is +12V. The PMOSFET Q1 is turned off. No voltage is provided to the power terminal VCC of the PWM controller U1, the PWM controller U1 is not activated. The fan power source V-c1 supplies power to the connector 200 via the third diode D3 to drive the fan 100 dissipate heat.

The voltage of the source of the PMOSFET Q1 is +5 V and the voltage of the gate of the PMOSFET Q1 is 0V when the computer powers off. The PMOSFET Q1 is turned on, the voltage of the drain of the PMOSFET Q1 is provided to the power terminal VCC of the PWM controller U1. The comparator U2 compares a voltage of the node B to a voltage of the node C. The first output OUT1 of the comparator U2 is at a high level when the voltage of the node C is higher than the voltage of the node B. The first output OUT1 of the comparator U2 is at a low level when the voltage of the node C is lower than the voltage of the node B.

The PWM controller U1 is activated when the synchronization/shut down input SY/SH is at a high level. The external gate-driver output EXT of the PWM controller U1 outputs the square wave to control the NMOSFET Q2. The NMOSFET Q2 is turned on and the drain of the PMOSFET Q1 charges the inductor L1 when the external gate-driver output EXT is at a high level. The NMOSFET Q2 is turned off and the inductor L1 discharges through the first diode D1 and the second diode D2 when the external gate-driver output EXT is at a low level. During the discharge duration, the voltage of the drain of the PMOSFET Q1 is superposed with the voltage of the inductor L1. Therefore, the voltage of the cathode of the first diode D1 is higher than the voltage of the drain of the PMOSFET Q1 during the discharging time. The voltage of the cathode of the first diode D1 can be stepped up to +12V by changing the charging time and discharging time of the inductor L1. The charging time and discharging time of the inductor L1 can be changed by altering the duration of the high level and the low level of the external gate-driver output EXT. The +12V voltage of the cathode of the first diode D1 supplies power to the connector 200 via the second diode D2. The fan 100 is activated to lower the temperature in the enclosure of the computer.

The resistance of the thermistor RT increases when the temperature in the housing of the computer decreases. The voltage of the node B between the resistor R6 and the thermistor RT increases. The voltage of the node C is lower than the voltage of the node B when the temperature in the housing is lower than the predetermined temperature. The first output OUT1 of the comparator U2 is at a low level, and the synchronization/shut down input SY/SH is at a low level. The PWM controller U1 does not work. The power supplying module 300 stops supplying power to the connector 200. The fan 100 thus stops rotating.

The foregoing description of the exemplary embodiments of the disclosure has been presented only for the purposes of illustration and description and is not intended to be exhaustive or to limit the disclosure to the precise forms disclosed. Many modifications and variations are possible in light of the above everything. The embodiments were chosen and described in order to explain the principles of the disclosure and their practical application so as to enable others of ordinary skill in the art to utilize the disclosure and various embodiments and with various modifications as are suited to the particular use contemplated. Alternative embodiments will become apparent to those of ordinary skills in the art to which the present disclosure pertains without departing from its spirit and scope. Accordingly, the scope of the present disclosure is defined by the appended claims rather than the foregoing description and the exemplary embodiments described therein.

What is claimed is:

1. A fan delay controlling apparatus, comprising:
   a connector connected to a fan of an electronic device;
   a power supplying module comprising a first terminal connected to a fan power source, a second terminal connected to a first stand-by power source, a third terminal connected to the connector, and a fourth terminal;
   a power controlling module connected to the fourth terminal of the power supplying module, wherein when the electronic device powers off, the power controlling module controls the power supplying module to provide power to the fan through the connector to drive the fan to dissipate heat; the power controlling module controls the power supplying module stop supplying power to the connector when an ambient temperature within the electronic device is lower than a predetermined value.

2. The fan delay controlling apparatus of claim 1, wherein the electronic device is a computer, the voltage of the fan power source is +12 volts, and the voltage of the stand-by power source is +5 volts.

3. The fan delay controlling apparatus of claim 1, wherein the power supplying module comprises a p-channel metal oxide semiconductor field effect transistor (PMOSFET), an inductor, a first capacitor, a first diode, a second diode, a third diode, an n-channel metal oxide semiconductor field effect transistor (NMOSFET), and a pulse width modulation (PWM) controller; the PWM controller comprises a power terminal, a ground terminal, a frequency input, a synchronization/shut down input, a positive current sense input, a power ground for external gate-driver/negative current sense input, a feed back input, a 5V on-chip regulator output, a 1.25V reference output, and an external gate-driver output; a source of the PMOSFET functions as the second terminal of the power supplying module, a gate of the PMOSFET is connected to the fan power source, a first terminal of the inductor is connected to a drain of the PMOSFET, a second terminal of the inductor is connected to a drain of the NMOSFET, a cathode of the first diode is grounded via the first capacitor, an anode of the first diode is connected to the drain of the NMOSFET, an anode of the third diode functions as the first terminal of the power supplying module, a cathode of the third diode functions as the third terminal of the power supplying module, a cathode of the second diode is connected to the cathode of the third diode, an anode of the second diode is connected to the cathode of the first diode, a source of the NMOSFET is grounded via a first resistor, the 5V on-chip regulator output is grounded via a second capacitor and is connected to the power terminal, the power terminal is connected to the drain of the PMOSFET, the external gate-driver output is connected to a gate of the NMOSFET, the positive current sense input is connected to the source of NMOSFET and grounded via the first resistor, the frequency input is grounded via a second resistor, the feed back input is connected to the cathode of the first diode via a third resistor and grounded via a fourth resistor, the 1.25V reference output is grounded via a third capacitor, the ground terminal and the external gate-driver/negative current sense input are both grounded, the synchronization/shut down input functions as the fourth terminal of the power supplying module.

4. The fan delay controlling apparatus of claim 3, wherein the power controlling module comprises a fifth resistor, a sixth resistor, a seventh resistor, a thermistor, and a comparator, a first terminal of the fifth resistor is connected to the drain of the PMOSFET, a second terminal of the fifth resistor is grounded via the seventh resistor, a first terminal of the sixth resistor is connected to the drain of the PMOSFET, a second terminal of the sixth resistor is grounded via the thermistor, the comparator comprises a first non-inverting input, a first inverting input, a first output, a power terminal, and a ground terminal, the first non-inverting input is connected to a node between the fifth resistor and the seventh resistor, the first inverting input is connected to a node between the sixth resistor and the thermistor, the power terminal is connected to the first stand-by power source, the grounded terminal is grounded, the first output is connected to the fourth terminal of the power supplying module.

5. The fan delay controlling apparatus of claim 1, wherein the connector comprises a voltage stabilizing diode, a power terminal and a ground terminal, the power terminal of the connector is connected a cathode of the voltage stabilizing diode, an anode of the voltage stabilizing diode is connected to the ground terminal of the connector.

6. The fan delay controlling apparatus of claim 5, further comprising a rotational speed detecting module, the connector further comprising a detecting terminal, wherein the rotational speed detecting module is connected to the detecting terminal of the connector, the rotational speed detecting module is allocated to detect rotating rate of the fan.

7. The fan delay controlling apparatus of claim 6, wherein the power terminal of the connector is further connected to the detecting terminal of the connector via a fifth resistor and grounded via a fourth capacitor.

8. The fan delay controlling apparatus of claim 5, further comprising a rotational speed controlling module, the connector further comprising a controlling terminal, wherein the rotational speed controlling module is connected to the detecting terminal of the connector, the rotational speed detecting module is allocated to detect rotating rate of the fan.

9. The fan delay controlling apparatus of claim 8, wherein the rotational speed controlling module comprises a fifth resistor, a sixth resistor, and a buffer, the buffer comprises a power terminal, a ground terminal, an input, and an output, the power terminal of the buffer is connected to a system power source, the ground terminal of the buffer is grounded, the input of the buffer is connected to the system power source via the fifth resistor, the input of the buffer is allocated to receive a PWM signal, the output is connected to the controlling terminal of the connector, and the output of the buffer is connected to a second stand-by power source via the sixth resistor.

* * * * *